April 8, 1941.  G. V. WOODLING  2,237,382
STABILIZER FOR VEHICLES
Filed June 6, 1938   3 Sheets-Sheet 1
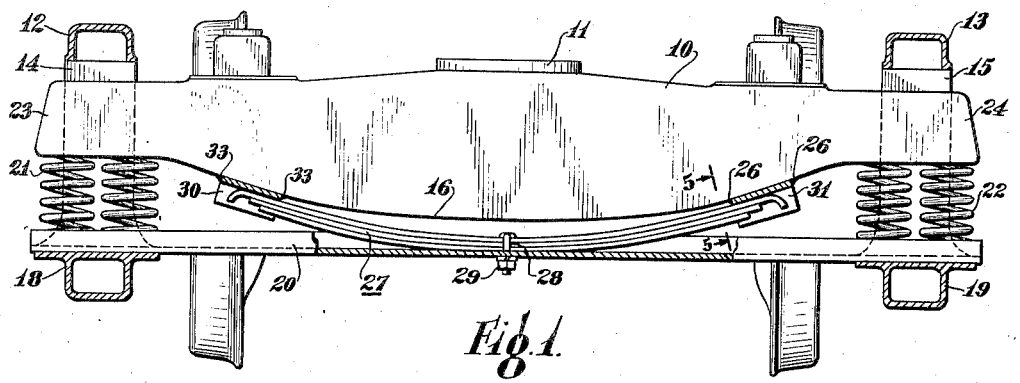
Fig.1.
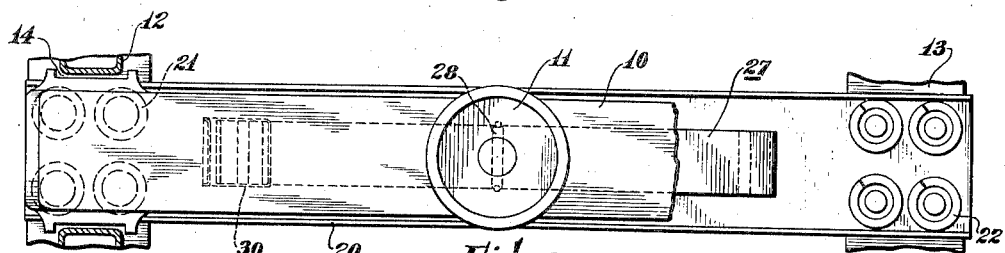
Fig.2.
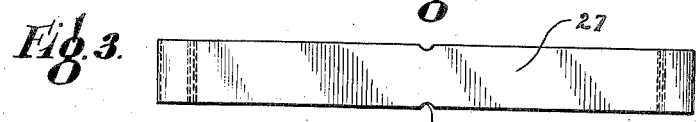
Fig.3.
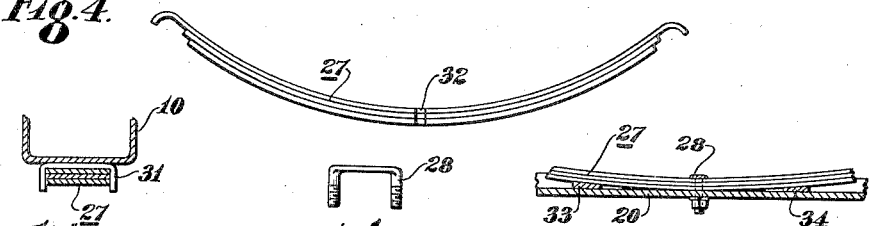
Fig.4.
Fig.5.  Fig.6.  Fig.7.
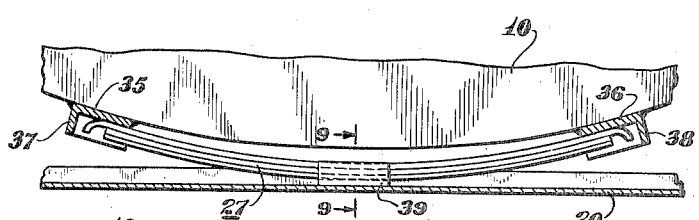
Fig.8.
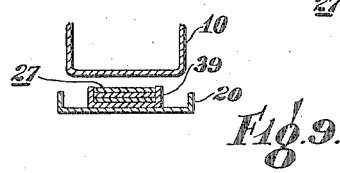
Fig.9.
INVENTOR.
George V. Woodling.

April 8, 1941.   G. V. WOODLING   2,237,382
STABILIZER FOR VEHICLES
Filed June 6, 1938   3 Sheets-Sheet 2
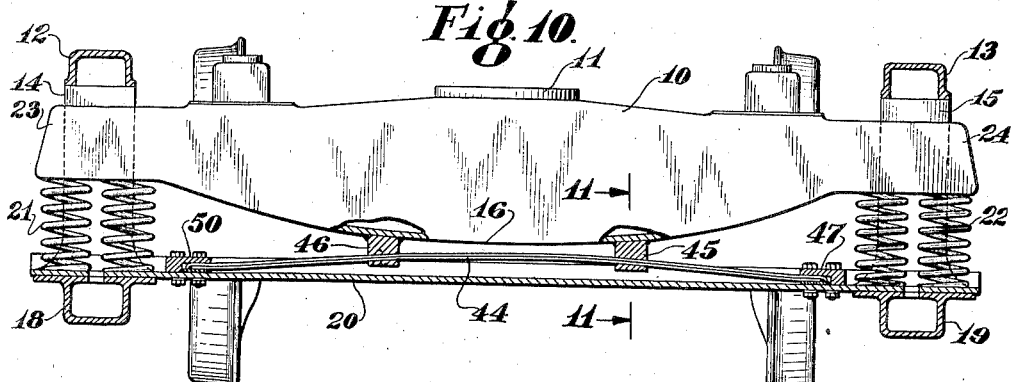
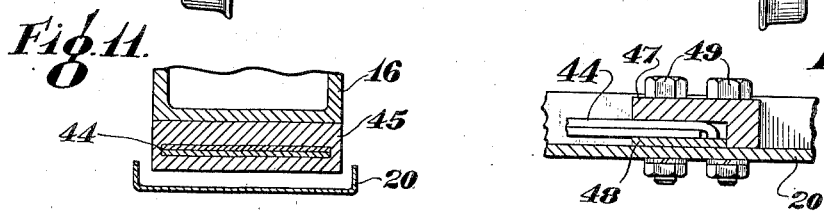
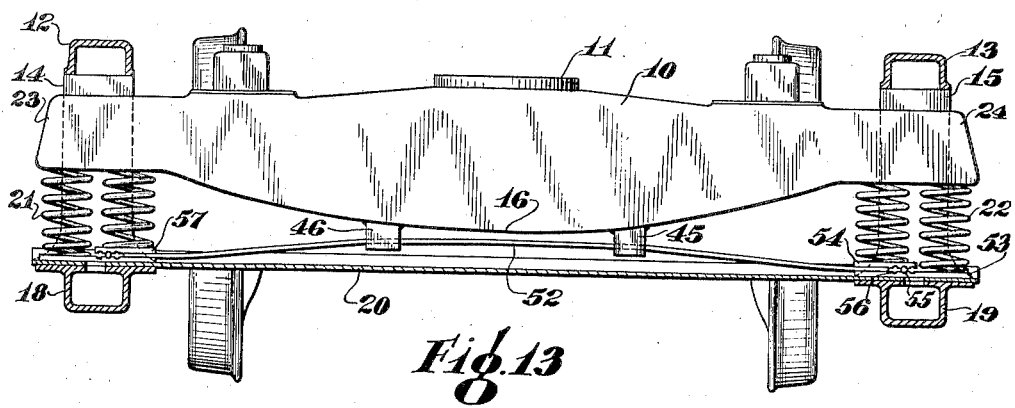
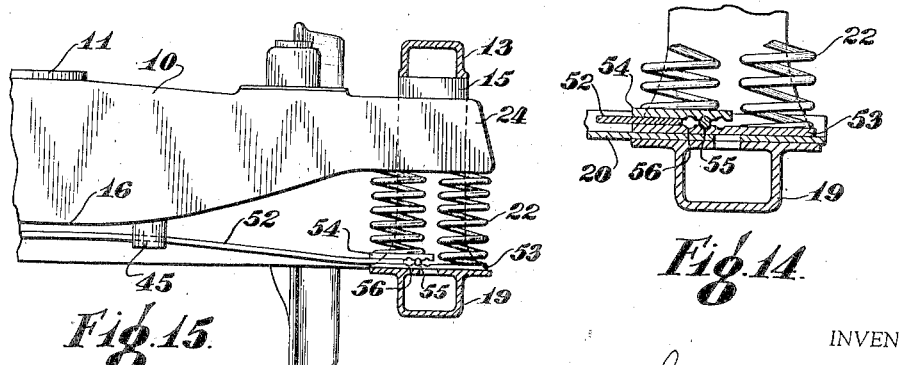
INVENTOR.
George V. Woodling

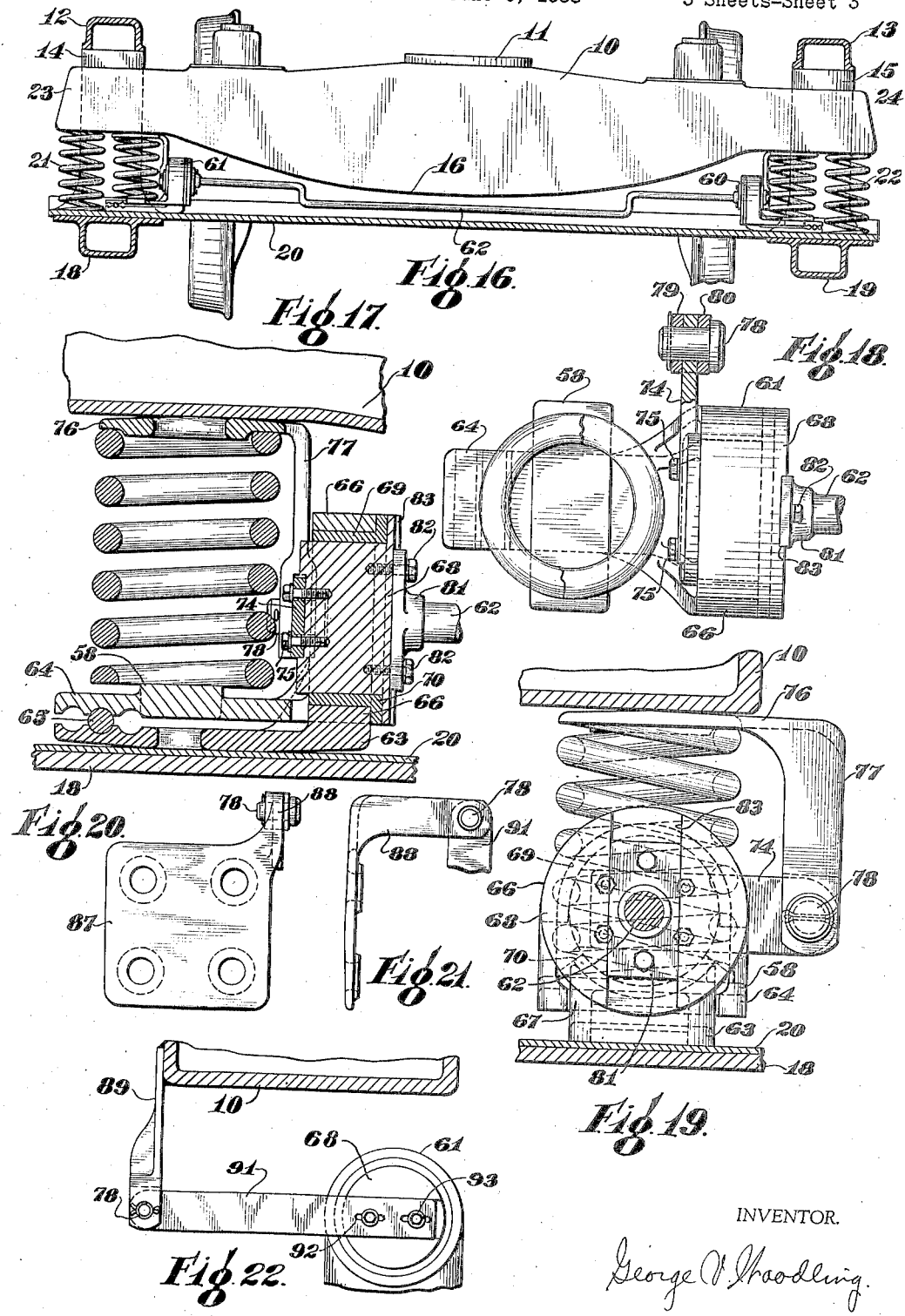

Patented Apr. 8, 1941

2,237,382

UNITED STATES PATENT OFFICE 2,237,382

STABILIZER FOR VEHICLES

George V. Woodling, Cleveland, Ohio

Application June 6, 1938, Serial No. 212,013

23 Claims. (Cl. 105—197)

My invention relates generally to means for improving the tracking characteristics and the riding qualities of vehicles and more particularly to rail vehicles.

In the following description, my invention will be described in connection with a rail vehicle, but it is to be understood that my invention applies to vehicles of all types. For the purpose of clarity and simplicity, the vehicle may be considered as having two main parts; one, the sprung mass and two, the unsprung mass. The sprung mass comprises that part of the vehicle which is supported by the springs and the unsprung mass comprises the axle and wheels and other parts that may be mounted thereon. In practically all freight cars, the body or sprung mass is supported on coils or helical springs which constitute the entire means for resiliently supporting the car body and its lading. It is known that coil springs absorb little of the work of compression applied to the springs and as a result at certain car speeds, known as critical speeds, the period of vibration of the coil springs coincides with impulses to the wheels due to passing over rail joints and other track irregularities. This causes the amplitude of the springs to build up and results in excessive dancing of the car body on the coil springs. This sometimes drives the coil springs solid and it generally results in damage to the car and its content, and to the rails. This dancing may amplify to the extent of causing derailment of the truck.

The dancing of the car body upon the coil springs may be characterized as vertical oscillations. In addition to vertical oscillations, there appears another form of oscillation which may be characterized as a rolling oscillation; that is, the body of the vehicle sidesways with reference to the unsprung mass. In the present design of rail vehicles, the vertical oscillations appear at lower speeds than the rolling oscillations. Thus, under relatively low speed, neither the vertical or the rolling oscillations appear, but as the speed of the rail vehicle is increased, there first appear throughout a certain speed bracket vertical oscillations and as the speed of the rail vehicle is still increased to a higher speed bracket, there appear the rolling oscillations. A discussion as to the cause of the rolling oscillations is set forth in my patent, No. 2,004,068, issued June 4, 1935, for Stabilizer for vehicles.

An object of my invention is to provide for improving the tracking characteristics and the riding qualities of a rail vehicle.

Another object of my invention is to provide for dampening both the vertical and the rolling oscillations of the sprung mass with respect to the unsprung mass.

Another object of my invention is to provide for dissipating the energy of a vehicle which tends to cause the sprung mass of the vehicle to dance or roll relative to the unsprung mass.

Another object of my invention is to minimize the dancing movements of the sprung mass of a vehicle relative to the unsprung mass to give easy riding qualities.

Another object of my invention is to minimize the rolling movement of the sprung mass of a rail vehicle relative to the unsprung mass to give easy riding qualities and improved tracking characteristics.

Another object of my invention is to employ absorbing means in addition to the coil springs of a rail vehicle to give easy riding qualities.

Another object of my invention is the provision of a stabilizer and absorbing means which may be readily and easily mounted upon existing car trucks without the use of nuts and bolts.

Another object of my invention is the provision of a stabilizer and absorbing means which may be mounted on existing rail vehicles without reconstructing the car trucks.

Another object of my invention is to provide for translating the vertical movements of the sprung mass with reference to the unsprung mass into rotary movements and for frictionally dampening the rotary movements.

Another object of my invention is to stabilize the sprung mass of a rail vehicle against side sway to give improved tracking characteristics and easy riding qualities.

An object of my invention is the provision of causing the dampening action to be in substantial accordance with the load carried by the supporting springs of the vehicle.

Another object of my invention is the design of a stabilizer and absorbing means which may be mounted upon existing car trucks without disassembly of the car trucks.

Other objects and a fuller understanding of my invention may be had by referring to the following description and claims, taken in connection with the accompanying drawings, in which like parts are designated by like reference characters, and in which:

Figure 1 is a transverse sectional view of a car truck for rail vehicles showing my invention as being applied thereto;

Figure 2 is a fragmentary plan view of a car truck showing my invention as being applied thereto;

Figure 3 shows a plan view of a stabilizing spring embodying the features of my invention;

Figure 4 is a side view of the stabilizing spring shown in Figure 3;

Figure 5 is cross-sectional view, taken along the line 5—5 of Figure 1;

Figure 6 shows a clamp which may be employed to secure my stabilizing spring in a fixed position;

Figure 7 is a fragmentary view showing a means of mounting my stabilizing spring to the spring plank of a car truck for rail vehicles;

Figure 8 shows a modified arrangement of mounting my stabilizing spring on the car truck of a rail vehicle;

Figure 9 is a cross sectional view, taken along the line 9—9 of Figure 8;

Figure 10 is a view similar to Figure 1 showing a modified arrangement of my stabilizing spring to dampen both vertical and rolling oscillations;

Figure 11 is a fragmentary and cross-sectional view, taken along the line 11—11 of Figure 10;

Figure 12 shows an enlarged cross-sectional view of the engaging means for engaging the ends of my stabilizing spring;

Figure 13 is a view similar to Figure 10 and illustrates another form of my stabilizing arrangement to dampen the vertical and rolling oscillations;

Figure 14 is an enlarged and cross-sectional view of the engaging means shown in Figure 13 for engaging the ends of my stabilizing spring;

Figure 15 is a fragmentary view similar to the showing in Figure 13 but with the spring plank of the car truck eliminated;

Figure 16 is a car truck view similar to Figures 1, 10 and 13 and shows a modified stabilizing arrangement for dampening the vertical and rolling oscillations;

Figure 17 is an enlarged sectional view of the mounting of my stabilizing arrangement as shown in Figure 16;

Figure 18 is an enlarged view showing the plan of my stabilizing arrangement of Figure 17;

Figure 19 is a view of my stabilizing arrangement looking into the right-hand side of the view shown in Figure 17;

Figure 20 is a modified top spring plate to facilitate the mounting of my stabilizing arrangement upon existing car trucks;

Figure 21 is a side view of the top spring plate shown in Figure 20; and

Figure 22 is a modified form of actuating my stabilizing arrangement directly from the bolster.

With particular reference to Figures 1 and 2 of the drawings, which shows a fragmentary view of a car truck of a rail vehicle, the sprung mass comprises in general the bolster 10 and the body which is not shown, but which pivotally rests upon the king plate 11 of the bolster 10. The unsprung mass comprises in general the wheels, the axle, the truck side frames 12 and 13, and the spring plank 20 which ties the lowermost portions 18 and 19 of the side frames together. The ends 23 and 24 of the bolster are arranged to be supported resiliently by a group of coil springs 21 and 22 respectively. As the ends 23 and 24 of the bolster move up and down, they are arranged to slide vertically within open windows 14 and 15 respectively in the side frames 12 and 13.

Under certain speed conditions, there is a tendency for the sprung mass, that is the bolster and other parts carried thereby, to oscillate relative to the unsprung mass, that is the side frames and the other associated parts. The oscillations appear in two different forms. In one form, they appear as vertical oscillations. In the second form, they appear as rolling oscillations. In the present design of rail vehicle trucks, the vertical oscillations appear at lower speed than the rolling oscillations, and thus under relatively low speed, neither the vertical nor rolling oscillations appear, but as the speed of the rail vehicle is increased, there first appear throughout a certain speed bracket vertical oscillations and as the speed of the rail vehicle is still increased to a higher speed bracket, there appear the rolling oscillations.

The stabilizing member, as shown in Figures 1 to 4, for dampening the vertical and rolling oscillations comprises in general a transverse leaf spring 27 interposed between the spring plank 20 and the bolster 10. The stabilizing leaf spring 27 bears downwardly at its middle portion and is supported by the spring plank 20 where the clearance is small between the spring plank 20 and the lowermost central portion 16 of the bolster. The ends of the stabilizing leaf spring 27 bow upwardly and slidably engage the underneath side of the end portions of the bolster where the clearance is large, so as to obtain a substantial curvature to the stabilizing leaf spring 27 which gives an effective dampening action. The central portion of the stabilizing leaf spring 27 may be secured to the spring plank 20 by means of a clamp 28 which engages notched portions 32 in the sides of the stabilizing spring and which extends through the spring plank 20 and is secured thereto by the nuts 29. The ends of the stabilizing leaf spring 27 are arranged to be slidably positioned in spring guides 30 and 31 which may be respectively welded, or otherwise suitably fastened, to the underneath side of the bolster as indicated by welds 26 and 33 respectively. The sides of the guides 30 and 31 are bent downwardly to keep the ends of the stabilizing leaf spring 27 from working out from underneath the bolster. This is shown best in Figure 5. The spring guides 30 and 31 are arranged to be constructed of wear resisting material so that they will stand hard and heavy service.

My stabilizing leaf spring 27 is arranged to dampen both the vertical and rolling oscillations to improve the tracking characteristics and the riding qualities of the vehicle. In the practice of my invention, the stabilizing leaf spring may be relatively wide and comprise a plurality of leaves which slide longitudinally relative to each other as the bolster moves vertically relative to the side frames. The longitudinal frictional sliding engagement between the several leaves of the stabilizing leaf spring 27 causes a dampening action which minimizes the vertical and the rolling oscillations of the sprung mass. The arc of the stabilizing leaf spring 27 is a maximum since the ends thereof bow upwardly and engage the outward portions of the bolster where the clearance between the bolster and the spring plank 20 is large. In view of the fact that the arc of the stabilizing leaf spring 27 is made as large as possible, the longitudinal frictional sliding engagement between the leaves is greater than it would be if the central portion of the stabilizing leaf spring 27 rested under the lower portion 16 of the bolster and with the ends of the stabilizing leaf spring 27 resting upon the spring plank. Therefore, very effective dampening may be obtained by mounting the stabilizing leaf spring 27 as I have shown in Figure 1.

In order to insure effective dampening of the rolling oscillations, the central portion of the stabilizing leaf spring 27 on the opposite sides of the clamp 28, may be supported by wedge members 33 and 34, as shown in Figure 7. These members 33 and 34 prevent the stabilizing leaf spring 27 from rocking about the clamping member 28.

In Figures 8 and 9, I show a modified arrangement of mounting my stabilizing leaf spring 27, in that the central portion is merely guided by a guide channel 39 suitably secured to the spring plank 20. To prevent the stabilizing leaf spring 27 from working laterally, guide members 35 and 36, suitably welded to the underneath side of the bolster 10, are employed. These members not only have downward engaging sides but also have downward engaging ends 37 and 38 respectively. By means of this mounting the stabilizing leaf spring 27 is held in position without any engaging clamps.

In Figures 10, 11 and 12, I show a modified form of my stabilizing spring which may be mounted upon existing trucks of rail vehicles. In this modified form, the stabilizing leaf spring is indicated by the reference character 44, and may comprise a plurality of leaves which move longitudinally relative to each other, as the bolster moves relative to the side frames. At two spaced locations on the opposite sides of the central portion of the bolster, there are provided two mounting members 45 and 46 which may be suitably welded, or otherwise attached, to the underneath side of the bolster. Each of the mounting members has an opening through which the stabilizing leaf spring 44 is positioned, see Figure 11. The ends of the stabilizing leaf spring 44 are arranged to be slidably fastened to the spring plank 20 by means of engaging members 47 and 50. An enlargement of the engaging member 47 is shown in Figure 12, and comprises an arrangement for slidably receiving the ends of the stabilizing leaf spring. Below the right-hand end of the leaf spring is a wear plate 48 which is held in position, together with the engaging member 47 by means of nuts and bolts 49. The engaging member 47 and the wear plate 48 may be durable wear resisting material so as to give long life against frictional wear. The engaging member 50 located on the opposite side of the truck frame is the same construction as that shown in Figure 12. The embodiment of my invention in Figure 10 is particularly adaptable for restraining the sprung mass against rolling oscillations as well as dampening vertical oscillations. If, for example, there is a tendency for the right-hand end 24 of the bolster to be depressed and for the left-hand end 23 of the bolster 10 to be elevated, then the mounting member 45 bears downwardly and the mounting member 46 bears upwardly upon the stabilizing leaf spring 44 to restrain the rolling movement of the sprung mass. The same, but reverse restraining action is produced when the left-hand end 23 of the bolster 10 is depressed and the right-hand end 24 of the bolster 10 is elevated. The vertical oscillations are dampened by the longitudinal frictional engagement between the leaves of the stabilizing leaf spring 44. The dimensions and strength of the stabilizing leaf spring 44 may be so proportioned as to give effective constraining action to the rolling oscillations and effective dampening action to the vertical oscillations.

In Figures 13 and 14, I show another modified form of my stabilizing arrangement and in this form the stabilizing spring may comprise a single leaf member 52 which is inserted or positioned through the mounting members 45 and 46 suitably welded or otherwise fastened to the underneath side of the bolster. In order to provide for dissipating the energy and dampening the vertical oscillations, I provide for frictionally mounting the end of the single stabilizing leaf spring 52 in pressure engaging devices mounted under the inside set of coil springs on opposite sides of the car truck. An enlarged and fragmentary view of the engaging device mounted on the right-hand side of the car truck is shown in Figure 14. As illustrated the frictional engaging device comprises a pressure engaging member 54 and a base 53 between which the end of the stabilizing spring 52 is frictionally mounted. The base 53 may rest underneath the entire group of coil springs 22. The pressure engaging plate 54 is arranged under the inside set of coil springs and is supported upon the base plate 53 by means of a fulcrum pin 55 arranged to be selectively positioned in the spaced grooves 56. The frictional engaging device 57 mounted on the left-hand side of the car truck is the same as that shown on the right-hand side of the truck. As the load of the bolster is increased, the pressure of the frictional engagement between the ends of the stabilizing spring 52 and the engaging devices is increased, and as the load upon the bolster is decreased, the frictional engagement is accordingly less. Therefore, the dampening action against the oscillations is substantially in accordance with the load of the sprung mass. The frictional engagement may be varied by positioning the fulcrum pin 55 in the several spaced grooves 56 to accommodate any size of rail vehicle. The arrangement shown in Figure 13 is effective in restraining the rolling oscillations as well as dissipating the vertical oscillations. The arrangement shown in Figure 15 is the same as that shown in Figure 13, except that the spring plank 20 is omitted.

The Figures 16, 17, 18 and 19 show another embodiment of my invention for constraining the rolling oscillations and dampening the vertical oscillations. In this embodiment a torque rod 62 is connected between two rotary frictional engaging devices 60 and 61 mounted on each side of the truck. The two rotary frictional engaging devices 60 and 61 are similar in construction, and the device 61 is shown in an enlarged view in Figures 17, 18 and 19. Positioned under one of the inside coil springs, is a base plate 63 upon which is fulcrumed a pressure plate 64 by means of a fulcrum pin 65 which fits in spaced selective openings as shown best in Figure 17. The pressure plate 64 is provided with a transverse integral portion 58 upon which the lower end of the coil spring rests. The inner free end of the pressure plate 64 is integrally provided with an upper arcuate drum support 66. Upon the inner end of the base plate 63 there is provided an integral upright support 67 which has an arcuate upper surface. The combination of the upper drum support 66 and the lower upright support 67 provides a circular drum which receives split frictional wear-members 69 and 70 which embrace a rotary member 68. The pressure of the coil spring bearing down upon the transverse portion 58 on the pressure plate 64 causes the upper drum support 66 to bear down upon the rotary member 68, very much in the same fashion as a brake drum or shoe engages a rotary wheel. As illustrated in Figure 17, the pressure of the drum support 66 upon the rotary member 68 may be varied by positioning the fulcrum pin 65 in the several selectable grooves. In this manner, the rotary frictional engaging devices may be adjusted to accommodate rail vehicles of various sizes and load capacities. The rotary member 68 is arranged to be actuated in accordance with the relative movements between the bolster 10 and the side frames. To this end, I provide a top spring plate 76 which fits between the upper end of the coil spring and the underneath side of the bolster. One corner of the top plate 76 extends outwardly and is then arranged to extend downwardly to form an arm 77. The lower end of the arm 77 is bifurcated at 79 and 80 and is arranged to be pivotally connected by means of a pivot pin 78 to an actuating arm 74 fastened to the rotary member 68 by means of stud bolts 75. In order to relieve the strain upon the stud bolts 75, the actuating arm 74 may be mounted in a longitudinal recess provided in the face of the rotary member 68. When the bolster 10 moves up and down relative to the side frames, the rotary member 68 is rotated within the frictional wear members 69 and 70. The resistance which the rotary members 68 offers to rotation varies substantially with the pressure of the load upon the coil spring. The entire arrangement shown in Figures 16, 17, 18 and 19 may be mounted in existing car trucks without changing the car design in any particular. It is only necessary in mounting my device to jack up the ends of the bolster and insert the assembly as shown in Figures 16 to 19 thereunder.

The rotary members of the two frictional engaging devices 60 and 61 are arranged to be connected together by means of torque rod 62. The torque rod is provided at its ends with a flange 81 which may be secured by stud bolts 82 to the inside surface of the rotary members. In order to relieve the strain upon the stud bolts 82, the flanges 81 may be arranged to fit within a transverse recess 83 provided in the face of the rotary members 68. Through the torque rod 62, the two rotary members 68 of the devices 60 and 61 are constrained to move together. In the embodiment of my invention, the torque rod 62 may be of any suitable size and strength to resist the rolling oscillations of the sprung mass relative to the unsprung mass. Upon pure vertical movements of the bolster with respect to the side frames, there is no twisting action produced in the torque rod 62. But when one of the ends of the bolster is depressed and the other end is elevated, a twisting action is set up in the torque rod 62 which opposes or restrains the sprung mass of the vehicle against sidesway with respect to the unsprung mass. The central portion of the torque rod 62 may be offset as illustrated in Figure 16. This gives greater angular flexibility than that afforded by a straight torque rod. Also, the offset central portion of the torque rod 62 aids to clear the central lower portion of the bolster.

In Figures 17 and 19, the top spring plate 76 is arranged to fit under a single coil spring because this keeps the assembly as a unit for each coil spring. In Figures 20 and 21, I have illustrated a top spring plate 87 which may be arranged to fit under all of the four springs illustrated, or under any other number of springs which the car truck may have. One corner of the top plate 87 may be brought out as illustrated and then extend downwardly and form an arm as indicated by the reference character 88 to actuate the rotary member 68.

In Figure 22 another arrangement is shown to actuate the rotary member 68 in accordance with the vertical movement of the bolster. In this latter arrangement a member 89 is connected or suitably welded to one edge of the bolster 10. In the arrangement shown in Figures 20, 21 and 22, the actuating arm 91 may be considerably longer than the actuating arm 74 shown in Figure 19. The length of the actuating arm 91 for actuating the rotary member 68 may extend for substantially the full width of the bolster. The arm 91 is arranged to be slidably connected to the rotary member 68 by fitting in a transverse recess. Stud bolts 93 which extend through elongated slots 92 may be employed to secure the arm 91 in the recess. The reason that the arm 91 is connected slidably to the rotary member 68, is that the pivot pin 78 is fixed in Figures 20, 21 and 22, whereas in Figures 17, 18 and 19, the pivot pin 78 may move since the top spring plate 76 may rock on top of the coil spring underneath the bolster.

For dampening pure vertical oscillations only the arrangement may omit the torque rod 62. The rotary frictional engaging devices may be held in position by means of the torque rod 62 or when no torque rod is employed the rotary assembly may be held in position by any suitable means such, for example, as by a projection on the underneath side of the bolster extending in the opening in the top spring plate 76 or by a projection in the spring plank 20 extending upwardly within the opening in the base plate 63. In removing the torque rod 62, it is only necessary to unscrew the stud bolts 82 and slide the flanges 81 on the end of the torque rod out of the lateral recesses 83. The arrangement as shown in Figures 16, 17, 18, 19, 20 and 21 may be mounted upon existing car trucks without disassembling the car trucks or changing their designs.

As the wear members 69 and 70 and the rotary member 68 wear away, the slack is automatically taken up within limits because the pressure plate 64 is permitted to fulcrum downwardly about the fulcrum pin 66. When the wear members 69 and 70 are worn thin and the rotary member 68 is worn correspondingly, they may be easily replaced by new parts.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a car truck construction, including in combination, side frames, a car truck bolster mounted transversely of the car truck, supporting springs carried by the side frames and resiliently supporting the ends of the bolster, a stabilizing flat spring positioned under the bolster to dampen oscillations, two spaced mounting means secured to the bolster, said mounting means engaging the stabilizing flat spring at two spaced points and holding the said spring at a distance from the bolster, said stabilizing flat spring between said two spaced points being free of external restraint and adapted to flex up-and-down and set up opposing forces therein to dampen oscillations, and two engaging means carried by the side frames for engaging the ends of the stabilizing flat spring and connecting same to the side frames, said stabilizing flat spring in combination with said spaced mounting means and said engaging means constraining the bolster against rolling oscillations relative to the side frames.

2. In a car truck construction, including in combination, side frames, a car truck bolster mounted transversely of the car truck, supporting springs carried by the side frames and resiliently supporting the ends of the bolster, a stabilizing flat spring positioned under the bolster to dampen oscillations, two spaced mounting means for securing two spaced portions of the stabilizing flat spring to the bolster, and two engaging means carried by the side frames for slidably and frictionally engaging the ends of the stabilizing flat spring, and means responsive to the load on the supporting springs to establish pressure between the engaging means and the ends of the stabilizing flat spring to vary the frictional resistance therebetween.

3. In a car truck construction, including in combination, side frames, a car truck bolster mounted transversely of the car truck, supporting springs carried by the side frames and resiliently supporting the ends of the bolster, a stabilizing flat spring positioned under the bolster to dampen oscillations, two spaced mounting means for securing two spaced portions of the stabilizing flat spring to the bolster, said stabilizing flat spring between said mounting means being free to flex and set up opposing forces therein to dampen oscillations, each end of the stabilizing flat spring positioned between the lower end of a supporting spring and the side frame on each side of the car truck and subjected to the load of the supporting springs.

4. In a car truck construction, including in combination, side frames, a car truck bolster mounted transversely of the car truck, supporting springs carried by the side frames and resiliently supporting the ends of the bolster, a stabilizing flat spring positioned under the bolster to dampen oscillations, two spaced mounting means for securing two spaced portions of the stabilizing flat spring to the bolster, and an engaging means carried by each of the side frames for slidably and frictionally engaging respectively each end of the stabilizing flat spring, each said engaging means comprising two parts engaging opposite sides of the respective end of the stabilizing flat spring mounted between the lower end of a supporting spring and the side frame on each side of the car truck.

5. In a car truck construction, including in combination, side frames, a car truck bolster mounted transversely of the car truck, supporting springs carried by the side frames and resiliently supporting the ends of the bolster, a stabilizing member mounted transversely of the car truck, rotary engaging means mounted on each side frame, each said rotary engaging means having relatively movable opposed parts, a rotary member frictionally engaged by the opposed parts of each of the rotary engaging means, means for subjecting the load of the bolster to the opposed parts of the engaging means to vary the frictional engagement between the rotary member and the rotary engaging means, means for connecting the ends of the stabilizing member to the two rotary members, and two spaced means actuated by the bolster and engaging two spaced end portions of the stabilizing member for imparting a rotary movement to the ends of the stabilizing member.

6. In a car truck construction, including in combination, side frames, a car truck bolster mounted transversely of the car truck, supporting springs carried by the side frames and resiliently supporting the ends of the bolster, a stabilizing member mounted transversely of the car truck, a base member, a pressure plate member mounted on the base member, the combination of the base member and the pressure member mounted between the lower end of a supporting spring and the side frame on each side of the car truck, rotary engaging means carried by the base member and the pressure member, a rotary member frictionally engaged by each of the rotary engaging means, means for subjecting the load of the bolster to the opposed parts of the engaging means to vary the frictional engagement between the rotary member and the rotary engaging means, means for connecting the ends of the stabilizing member to the two rotary members, and two spaced means actuated by the bolster and engaging two spaced end portions of the stabilizing member for imparting a rotary movement to the ends of the stabilizing member.

7. In a car truck construction, including in combination, side frames, a car truck bolster mounted transversely of the car truck, supporting springs carried by the side frames and resiliently supporting the ends of the bolster, a stabilizing member mounted transversely of the car truck, a base member, a pressure plate member mounted on the base member, the combination of the base member and the pressure member mounted between the lower end of a supporting spring and the side frame on each side of the car truck, rotary engaging means carried by the base member and the pressure member, a rotary member frictionally engaged by each of the rotary engaging means, means for subjecting the load of the bolster to the opposed parts of the engaging means to vary the frictional engagement between the rotary member and the rotary engaging means, means for connecting the ends of the stabilizing member to the two rotary members, mounting members positioned between the top of a supporting spring and the bolster on each side of the car truck, two actuating spaced means engaging two spaced end portions of the stabilizing members, and means for connecting the actuating spaced means to the mounting members to impart a rotary movement to the ends of the stabilizing member.

8. In a car truck construction, including in combination, side frames, a car truck bolster mounted transversely of the car truck, supporting springs carried by the side frames and resiliently supporting the ends of the bolster, rotary engaging means mounted on each side frame, each said rotary engaging means having relatively movable opposed parts, a rotary member frictionally engaged by each of the rotary engaging means, means for subjecting the load of the bolster to the opposed parts of the engaging means to vary the frictional engagement between the rotary member and the rotary engaging means, and means for rotating the rotary members in accordance with the movements of the bolster.

9. In a car truck construction, including in combination, side frames, a car truck bolster mounted transversely of the car truck, supporting springs carried by the side frames and resiliently supporting the ends of the bolster, rotary engaging means mounted on each side frame, each said rotary engaging means having relatively movable opposed parts, a rotary member frictionally engaged by each of the rotary engaging means, means for subjecting the load of the bolster to the opposed parts of the engaging means to vary the frictional engagement between the rotary member and the rotary engaging means, means for rotating the rotary members in accordance with the movements of the bolster, and stabilizing means positioned transversely of the car truck and connecting the two rotary members together.

10. In a vehicle having a sprung mass supported upon an unsprung mass by resiliently supporting means, rotary engaging means mounted on each side of the vehicle, each said rotary engaging means having relatively movable opposed parts, a rotary member frictionally engaged by each of the rotary engaging means, means for subjecting the load of the sprung mass to the opposed parts of the engaging means to vary the frictional engagement between the rotary member and the rotary engaging means, and means for rotating the rotary members in accordance with the relative movement between the sprung and unsprung masses.

11. In a vehicle having a sprung mass supported upon an unsprung mass by resiliently supporting means, rotary engaging means mounted on each side of the vehicle, a rotary member frictionally engaged by each of the rotary engaging means, means for subjecting the load of the sprung mass to the opposed parts of the engaging means to vary the frictional engagement between the rotary member and the rotary engaging means, means for rotating the rotary members in accordance with the relative movement between the sprung and unsprung masses, and stabilizing means positioned transversely of the vehicle and connecting the two rotary members together.

12. In a car truck construction, including in combination, side frames, a car truck bolster mounted transversely of the car truck, supporting springs carried by the side frames and resiliently supporting the ends of the bolster, stabilizing means mounted transversely of the car truck, engaging means carried by each of said side frames for frictionally engaging the ends of the stabilizing means, each said engaging means comprising two parts bearing upon opposed portions of the ends of the stabilizing means, said parts being movable relative to each other to compensate for wear, transmitting means for transmitting the relative movements of the bolster and the side frames to the stabilizing means, said transmitting means comprising two spaced means actuated by the bolster and engaging two spaced portions of the stabilizing means to impart movement to the ends of the stabilizing means between the two parts of the engaging means, and means for subjecting the load of the sprung mass to the frictionally engaging parts to vary the frictional engagement therebetween.

13. In a vehicle having a sprung mass supported upon an unsprung mass by resilient supporting means, engaging means having frictionally engaging parts, said frictionally engaging parts comprising two engaging portions and an intermediate portion positioned therebetween, said engaging means being located externally of the supporting means, means externally of the supporting means responsive to the relative movements of the sprung and unsprung masses for imparting relative movement between the intermediate portion and each of the two engaging portions of the frictionally engaging parts of the engaging means, and means for subjecting the load of the sprung mass to the frictionally engaging parts to vary the frictional engagement therebetween, said one of the two engaging portions being stationary, and said other of the two engaging portions being movable, with reference to one of the masses of the vehicle.

14. In a vehicle having a sprung mass supported upon an unsprung mass by resilient supporting means, engaging means having frictionally engaging rotary parts, said engaging means being located externally of the supporting means, means externally of the supporting means responsive to the relative movements of the sprung and unsprung masses for imparting relative rotary movement to the frictionally engaging parts of the engaging means, and means for subjecting the load of the sprung mass to the frictionally engaging rotary parts to vary the frictional engagement therebetween.

15. In a vehicle having a sprung mass supported upon an unsprung mass by resilient supporting means, engaging means having frictionally engaging parts mounted on each side of the vehicle, means responsive to the relative movements of the sprung and unsprung masses for imparting relative movement to the frictionally engaging parts of the engaging means, means for subjecting the load of the sprung mass to the frictionally engaging parts to vary the frictional engagement therebetween, and stabilizing means positioned transversely of the vehicle and connecting the engaging means on each side of the vehicle together.

16. In a vehicle having a sprung mass supported upon an unsprung mass by resilient supporting means, engaging means having frictionally engaging parts, means responsive to the relative movements of the sprung and unsprung masses for imparting relative movement to the frictionally engaging parts of the engaging means, means including fulcrum means for subjecting the load of the sprung mass to the frictionally engaging parts to vary the frictional engagement therebetween, said fulcrum means being adjustable for varying the influence of the load of the sprung mass on the frictionally engaging parts.

17. In a vehicle having a sprung mass supported upon an unsprung mass by resilient supporting means, engaging means having frictionally engaging parts positioned between one end of the resilient supporting means and one of said masses, mounting means positioned between the other end of the resilient supporting means and the other said mass, and means external of the supporting means for connecting the engaging means and the mounting means to impart relative movement to the frictionally engaging parts.

18. In a vehicle having a sprung mass supported upon an unsprung mass by resilient supporting means, engaging means mounted on each side of the vehicle having frictionally engaging parts positioned between one end of the resiliently supporting means and one of said masses, mounting means positioned between the other end of the resiliently supporting means and the other said mass, means connecting the engaging means and the mounting means to impart relative movement to the frictionally engaging parts, and stabilizing means positioned transversely of the vehicle and connecting the engaging means on each side of the vehicle together.

19. In a vehicle having a sprung mass supported upon an unsprung mass by resilient supporting means, engaging means having frictionally engaging parts positioned between one end of the resilient supporting means and one of said masses, one of said frictionally engaging parts comprising pressure plate means, fulcrum means for mounting the pressure plate means, and means external of the supporting means responsive to the relative movements of the sprung and unsprung masses for imparting relative movement to the frictionally engaging parts of the engaging means.

20. In a car truck construction, including in combination, side frames, a car truck bolster mounted transversely of the car truck, supporting springs carried by the side frames and resiliently supporting the ends of the bolster, engaging means having frictionally engaging parts positioned between the supporting springs and the side frames, mounting means positioned between the supporting springs and the bolster, and means external of the supporting springs connecting the engaging means and the mounting means to impart relative movement to the frictionally engaging parts.

21. In a car truck construction including in combination, side frames, a spring plank mounted transversely of the car truck and with its ends supported by the side frames, a car truck bolster with engaging means thereon mounted transversely of the car truck and above the spring plank, supporting springs carried by the side frames and resiliently supporting the ends of the bolster, a stabilizing spring interposed between the spring plank and the bolster to dampen oscillations, wearing means on the ends of said spring plank, said stabilizing spring engaging said bolster at said engaging means and slidably engaging said wearing means on said spring plank, and means responsive to the load on the supporting springs to establish pressure between the stabilizing spring and said wearing means to vary the frictional resistance to sliding between the stabilizing spring and the wearing means on the said spring plank.

22. In a car truck construction, including in combination, side frames, a car truck bolster mounted transversely of the car truck, supporting springs carried by the side frames and resiliently supporting the ends of the bolster, torsion bar means mounted transversely of the car truck, engaging means carried by each of said side frames for frictionally engaging the ends of the torsion bar means, each said engaging means comprising two parts bearing upon opposed portions of the ends of the torsion bar means, said parts being movable relative to each other to compensate for wear, transmitting means for transmitting the relative movements of the bolster and the side frames to the torsion bar means, said transmitting means comprising two spaced means actuated by the bolster and engaging two spaced portions of the torsion bar means to impart movement to the ends of the torsion bar means between the two parts of the engaging means, and means for subjecting the load of the bolster to the frictionally engaging parts to vary the frictional engagement therebetween.

23. In a car truck construction, including in combination, side frames, bolster means mounted transversely of the car truck and supported by the side frames, frictional bearing means on each side of the truck, torsion bar means extending transversely of the car truck and having end portions fitting into the frictional bearing means, means transmitting movements of the bolster to spaced portions of the torsion bar means and means responsive to the load on the bolster to establish pressure between the bearing means and the torsion bar means to vary the friction therebetween.

GEORGE V. WOODLING.